Nov. 28, 1933. J. GATTONI 1,937,223
MAGNETIC DAMPING APPARATUS FOR PRECISION BALANCES
Filed June 26, 1933
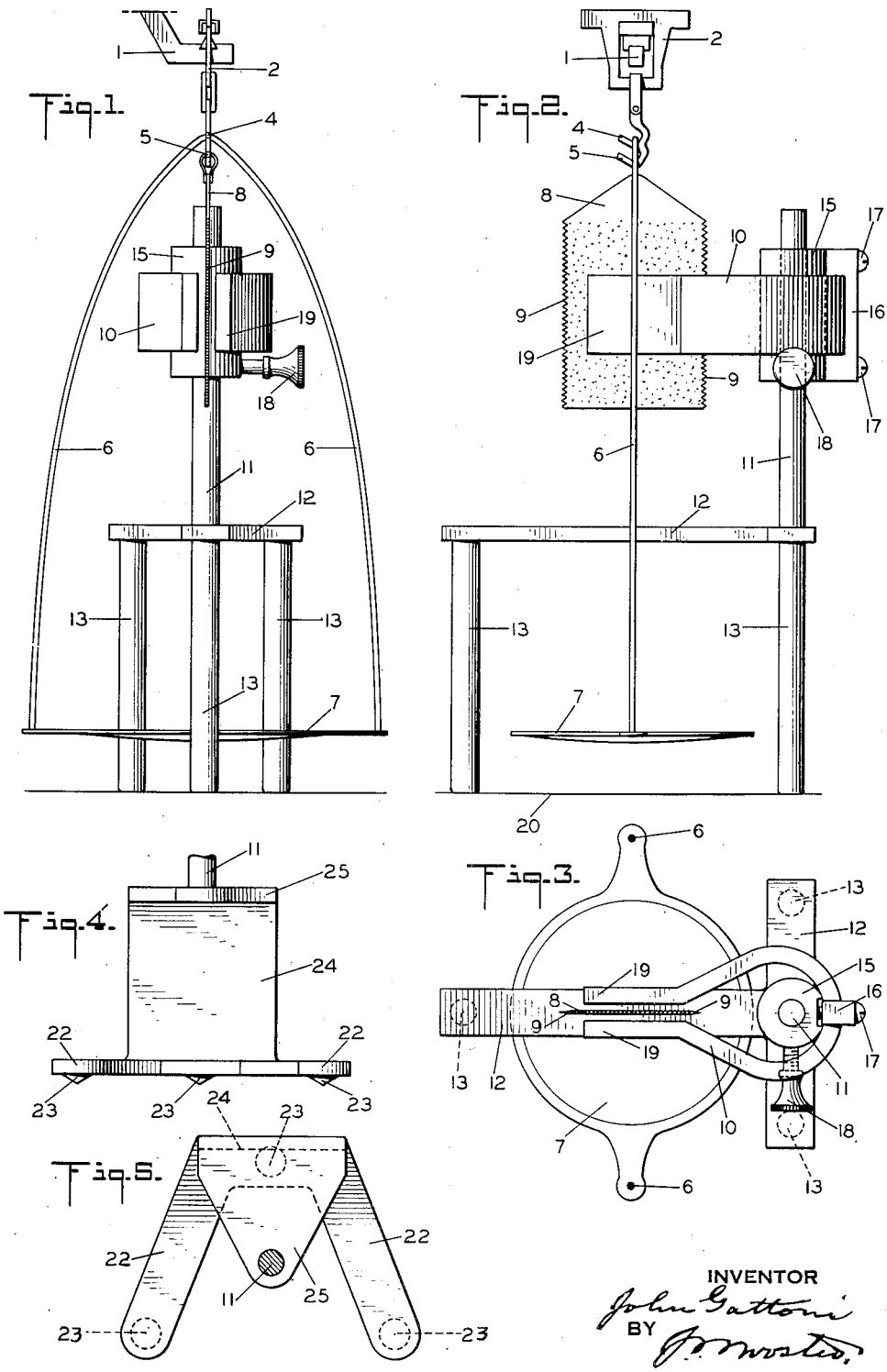
INVENTOR
John Gattoni
BY
ATTORNEY Patented Nov. 28, 1933

1,937,223

UNITED STATES PATENT OFFICE 1,937,223

MAGNETIC DAMPING APPARATUS FOR PRECISION BALANCES

John Gattoni, Union City, N. J., assignor to Seederer-Kohlbusch, Inc., Jersey City, N. J., a corporation of New Jersey Application June 26, 1933. Serial No. 677,709

6 Claims. (Cl. 188—104)

This invention relates to improvements in a magnetic damper for precision balances, and has for its object to carry out the advantages disclosed in my Patent #1,900,641, dated March 7, 1933 in a less expensive manner, and also to provide a portable collapsible device which can be carried around by a salesman for demonstrating the advantages of magnetic damping as set forth in said patent on an ordinary precision balance not originally built to be magnetically damped. In connection with the principle disclosed and claimed in said patent of suspending the damping plate from the beam independently of the suspension of the scale pan, the present invention comprises a small portable stand constructed to be set on the floor of the scale casing adjacent, but not interfering with one of the scale pans, and carrying an upright arm to which is attached a magnet having its poles projecting laterally so as to cooperate with the damping plate suspended from the scale beam. By shifting the stand and the magnet relatively to the damping plate, the damping effect can be varied as desired. In the accompanying drawing, Fig. 1 is a front elevation of a device embodying the invention;

Fig. 2 is an end elevation;

Fig. 3 is a top plan view of Fig. 2;

Fig. 4 shows a modified form of support; and

Fig. 5 shows a plan view of Fig. 4.

The device of this invention is usable in connection with the scale shown in the aforesaid patent, the central support and the beam mounting and beam details not being illustrated herein as same will be understood from said patent.

1 represents an end portion of the beam which, as will be understood, is centrally pivoted on the usual upright support. The beam carries pivoted at each end a yoke frame such as 2, a suitable form being shown in detail in said patent. As herein shown, the yoke frame 2 carries depending hooks 4, 5, the upper hook 4 preferably carrying bow 6 which in turn carries scale pan 7, and the lower hook 5 pivotally carrying damping plate 8 of non-magnetic material such as aluminum and preferably having serrated edges 9 to increase the damping effect.

10 is the magnet adjustably mounted on upright 11, which is attached to a T-base 12 supported by three legs 13 as seen in Fig. 3.

As shown herein, the magnet 10 encircles collar 15 sliding on upright 11 and carrying a set screw 18 to clamp it to the rod. The magnet is clamped to collar 15 by a yoke piece 16 fastened by screws 17 threaded into collar 15. Not much adjustment in the magnet mounting except for height to cooperate with damping plate 8 is required, as the parallelism between the poles 19 of the magnet and the damping plate 8 as shown in Fig. 3 is easily obtained by sliding the support on the floor 20 of the usual casing (not shown) in which precision balances of this type are generally used. The supporting parts for the magnet and the magnet clamping and adjusting means are made of non-magnetic material, and the damping plate is preferably hung as high as possible above scale pan 7, so as to keep stray fields away from influencing the scale pan or magnetic material thereon.

Figs. 4 and 5 show a modified form of base consisting of a flat U-shaped frame 22 carrying three short supporting feet 23. Extending upwardly from the base of the U is a vertical plate 24, which at its upper end carries a horizontal plate 25 to which may be attached support 11. In this form the scale pan 7 comes between lower base 22 and upper base 25, and this form is also made of non-magnetic material.

The invention claimed is:

1. In a balance, a pivoted beam, a scale pan suspended from said pivoted beam, a damping plate pivotally suspended from said beam independently of said scale pan, a movable stand adapted to be positioned adjacent the scale pan so as not to interfere with its movement, and a magnet carried by said stand to cooperate with said damping plate.

2. In a balance, a pivoted beam, a scale pan suspended from said pivoted beam, a damping plate pivotally suspended from said beam independently of said scale pan, a movable stand adapted to be positioned adjacent the scale pan so as not to interfere with its movement, a magnet carried by said stand to cooperate with said damping plate, and means for varying the height of the magnet relatively to said damping plate.

3. In a device for damping a balance, a magnet support comprising a tripod base, an upright carried by said base, and a magnet carried by said upright having its poles disposed laterally of the upright.

4. In a device for damping a balance, a magnet support comprising a base adapted to overlie a scale pan, supporting means therefor, an upright carried by said base, and a magnet carried by said upright having its poles disposed laterally of the upright.

5. In a device for damping a balance, a magnet support comprising a base adapted to underlie a scale pan, supporting means therefor, an upright carried by said base and adapted to overlie the scale pan, and a magnet carried by said upright having its poles disposed laterally of the upright.

6. In a device for damping a balance, a portable unit comprising a base, an upright carried by said base, means for clamping a magnet to said upright, all composed of non-magnetic material, and a magnet having its poles disposed laterally of the upright.

JOHN GATTONI.